Figure 3:
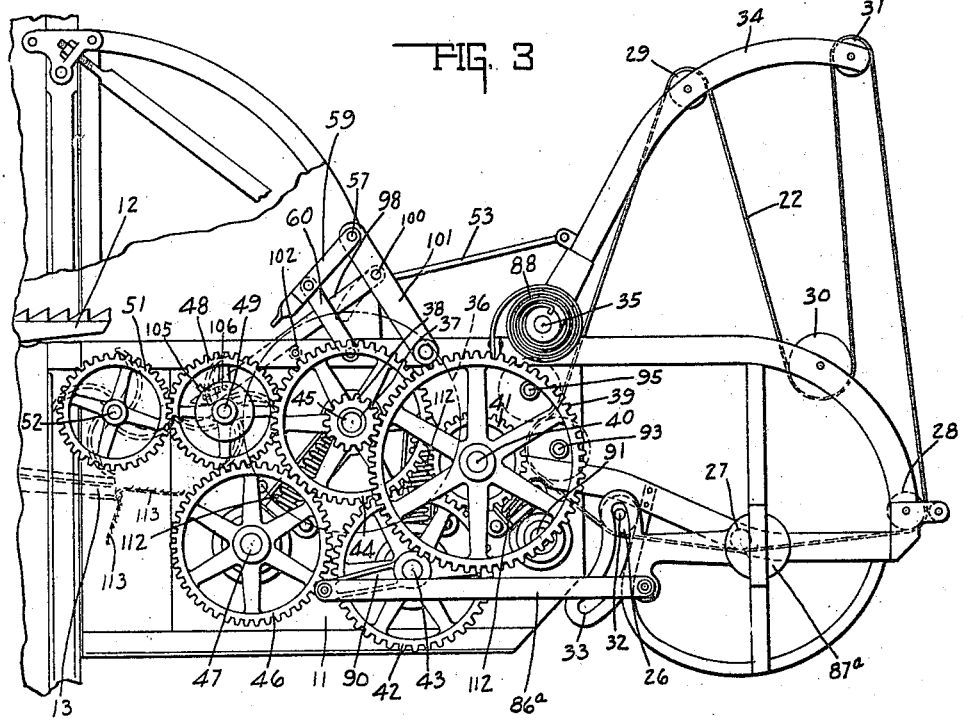

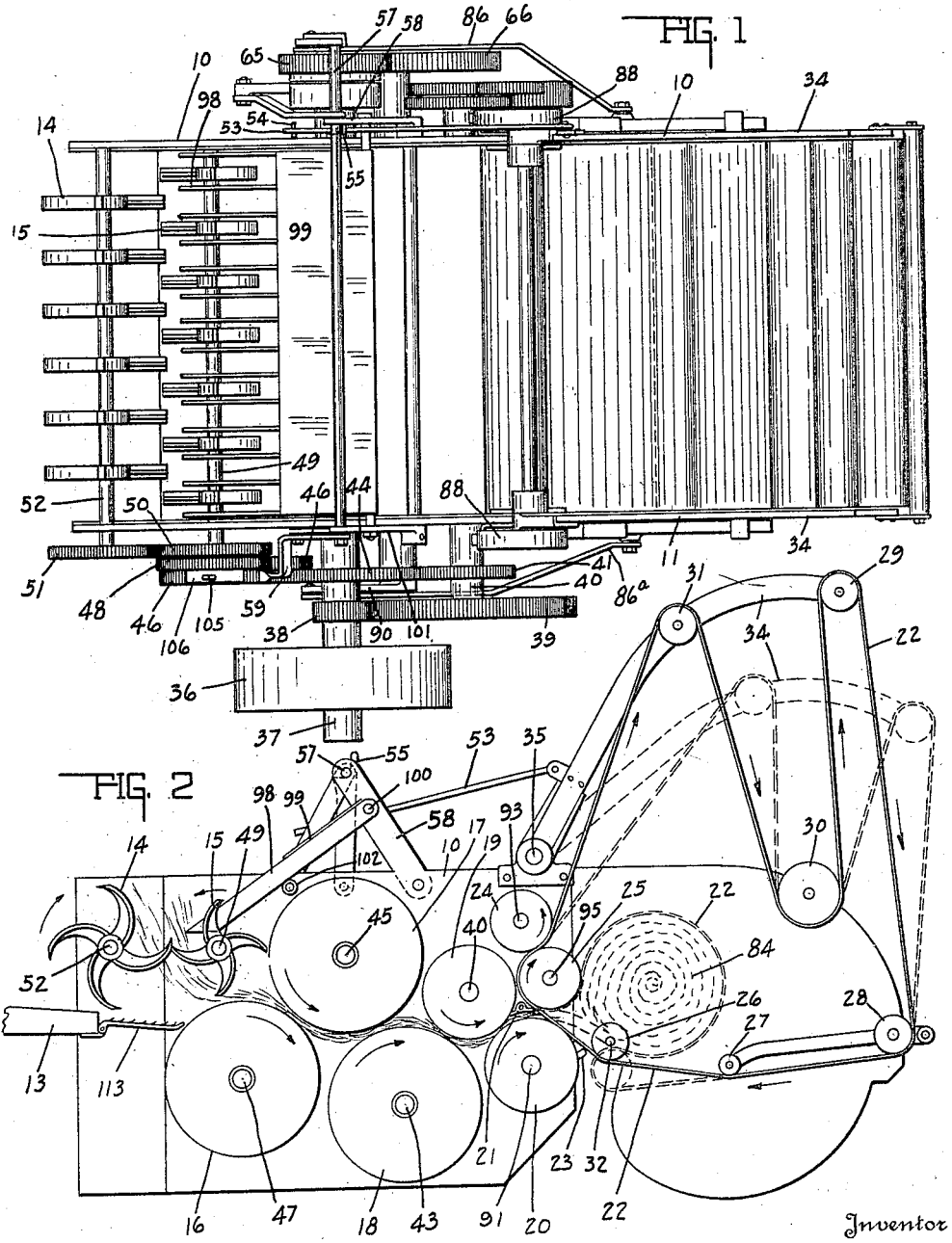

Inventor
BRAZELTON T. BROWN.

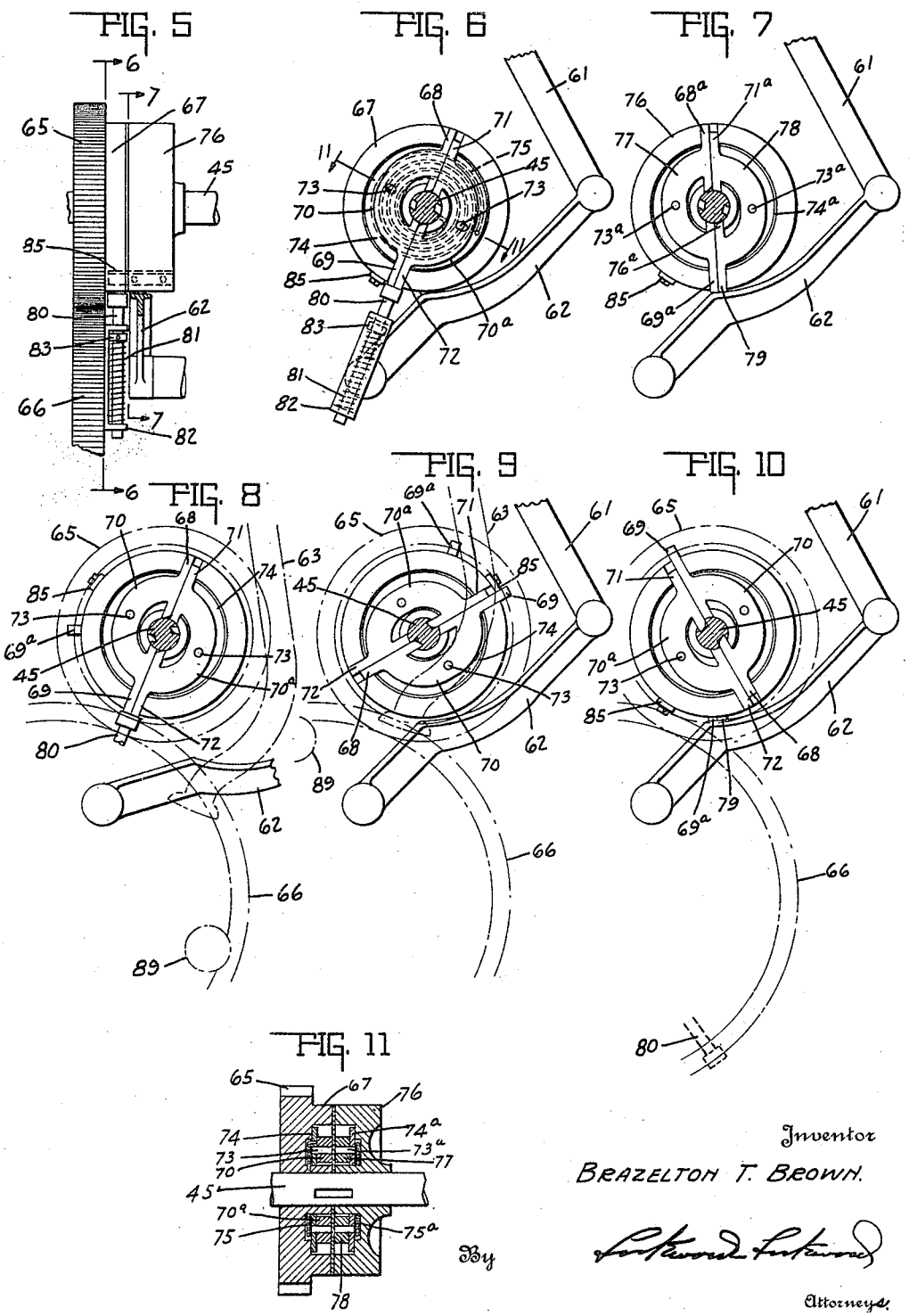

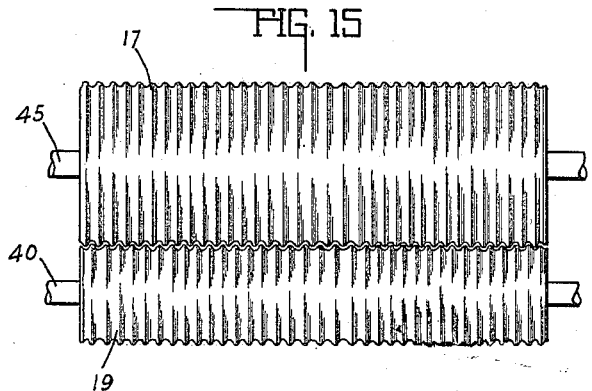
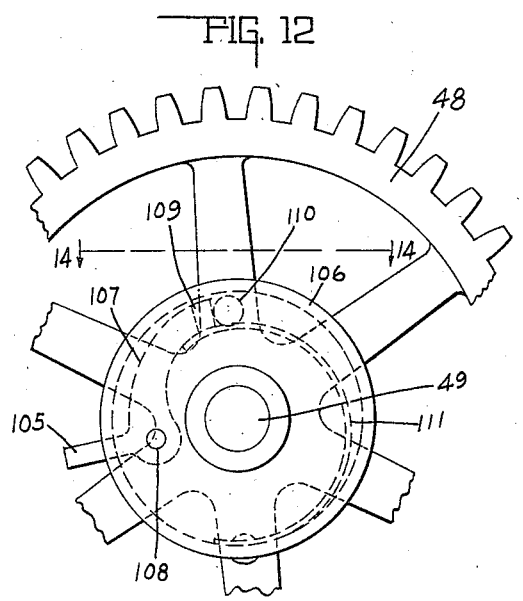
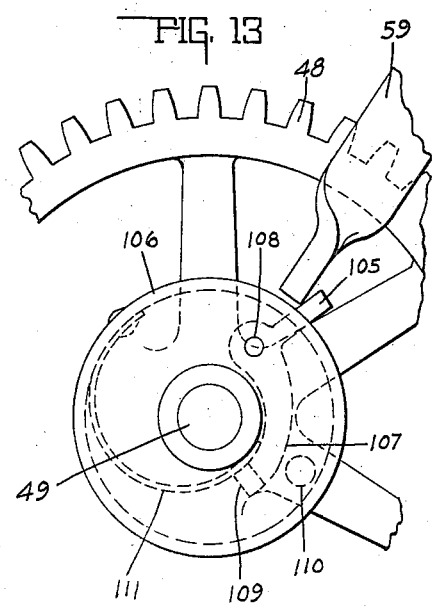
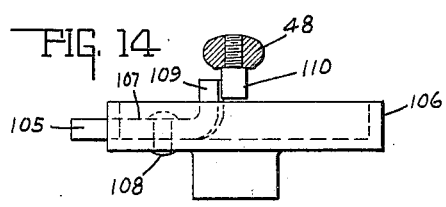

Patented Mar. 11, 1924.

1,486,360

UNITED STATES PATENT OFFICE.

BRAZELTON T. BROWN, OF INDIANAPOLIS, INDIANA, ASSIGNOR TO NATIONAL AUTOMATIC WIRELESS BALER COMPANY, OF INDIANAPOLIS, INDIANA, A CORPORATION.

AUTOMATIC WIRELESS BALER.

Application filed January 10, 1922. Serial No. 528,170.

*To all whom it may concern:*

Be it known that I, BRAZELTON T. BROWN, a citizen of the United States, and a resident of Indianapolis, county of Marion, and State of Indiana, have invented a certain new and useful Automatic Wireless Baler; and I do hereby declare that the following is a full, clear, and exact description thereof, reference being had to the accompanying drawings, in which like numerals refer to like parts.

This invention relates to an automatic baling machine for straw and the like which is adapted to be used in connection with a threshing machine for baling the straw rather than having it discharged into a stack.

The object of the invention is to provide an automatic machine adapted to be connected with the threshing machine into which the straw will be discharged from the threshing machine, formed into a sheet and baled by rolling the sheet into a cylindrically-shaped bale, cutting it off, and discharging the bale when it reaches a fixed size or diameter.

Another feature of the invention lies in the mechanism for automatically stopping the supply of straw when the bale reaches a certain size, tearing the ends so as to leave them straggling, discharging the bale, and immediately starting the formation of a new bale.

Other features of the invention which will be more fully set forth in the specifications comprise the spirally disposed ribs upon the belt pulleys for frictionally centering the belt upon the rollers; the cut-off mechanism which combs out the straw and pulls it apart as it is drawn therethrough by the rollers so as to leave straggling ends instead of having a sharp cut-off; means for causing the feeding arms to rotate faster than the feeding rolls, whereby they will tend to comb out the straw and straighten it out before it is compressed between the rollers; the pivotally mounted projections on the chaff riddle, whereby the chaff can either be discharged into the machine with the straw or dropped to the ground without entering the machine; the corrugated compression and feed rollers which operate together to more completely compress and form the straw into a homogeneous sheet; the guide member and lip mounted adjacent the belt for maintaining the straw sheet in position with respect thereto for commencing the formation of the bale; the arrangement of the clutch mechanism for timing the operation of the machine after the bale reaches a certain size for causing the unwound straw contained therein to be wound upon the bale before it is discharged, and the adjustable means for permitting the size or diameter of the bale to be varied as desired.

The full nature of the invention will be understood from the accompanying drawings and the following description and claims.

Figure 4:
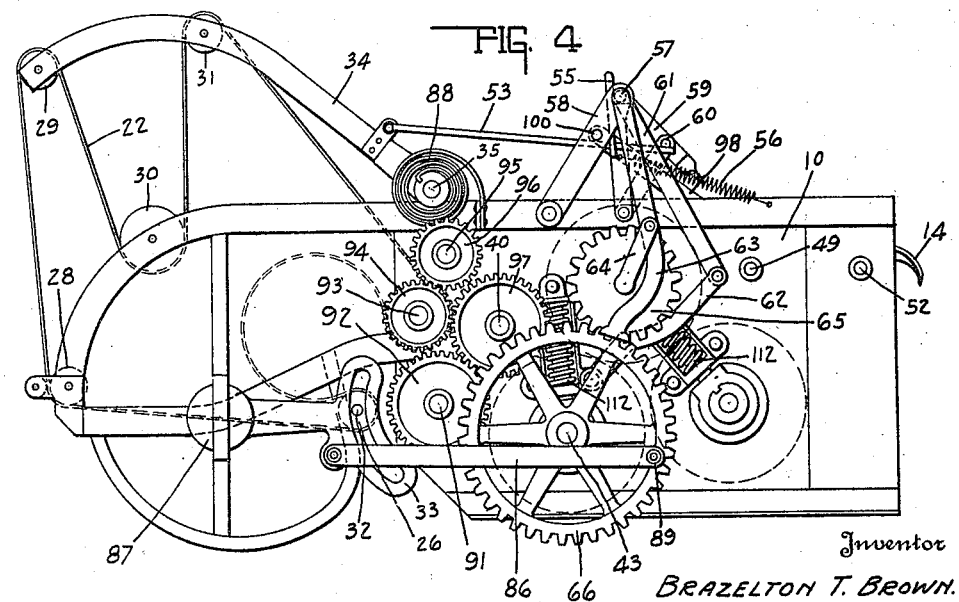

In the drawings, Fig. 1 is a plan view looking down upon the machine. Fig. 2 is a side elevation of the machine with the side plate removed showing the rolls mounted therein. Fig. 3 is a side elevation of the machine upon the power driving side thereof. Fig. 4 is a side elevation of the machine showing the opposite side to Fig. 3 of the clutch and feed timing mechanism. Fig. 5 is an end elevation of the clutch mechanism mounted on the side plate shown in Fig. 4. Fig. 6 is a section taken on the line 6—6 of Fig. 5. Fig. 7 is a section taken on the line 7—7 of Fig. 5. Fig. 8 is the same as Fig. 6, shown in partially operated position. Fig. 9 is the same as Fig. 8 showing it in further operated position. Fig. 10 is the same as Fig. 9 showing it in still further operated position just previous to its position shown in Fig. 6. Fig. 11 is a longitudinal section through the clutch, taken on the line 11—11 of Fig. 6. Fig. 12 is an enlarged view of the cut-off actuating mechanism showing it in normal position for permitting the feeding of the material. Fig. 13 is the same as Fig. 12 showing it in position for actuating the cut-off mechanism for cutting off the further feeding of the material into the machine. Fig. 14 is a section taken on the line 14—14 of Fig. 12. Fig. 15 is a side elevation of a pair of engaging rollers. Fig. 16 is a side elevation of a belt roller.

In the drawings there is shown a baling machine having a frame comprising the side plates 10 and 11 between which the operating mechanism is mounted. On the outside of the plate 10 the controlling mechanism is mounted, and the driving mechanism is mounted upon the outside of the plate 11. Said machine is adapted to be associated with a threshing machine and the feed end thereof is positioned adjacent the discharge end of the threshing machine so that the straw discharged therefrom will be discharged into this machine. The straw racks 12 of the threshing machine are shown in Fig. 3 and the grain pan and chaffer 13 of the threshing machine is shown in Fig. 2.

The straw discharged into the baling machine is caught by the rotary arms 14 and carried over to the rotary arms 15 which rotate in the opposite direction to the arms 14, as indicated in Fig. 2. The straw is carried by the arms 15 to the top of the roller 16 and squeezed between said roller and the adjacent roller 17. The straw follows the surface of the roller 17 underneath the same on to the adjacent roller 18 over which it is carried. It then passes under the roller 19 between said roller and the roller 18, and thence over the roller 20. Immediately above the roller 20, there is a guide member 21 which prevents the sheet of straw, which has now been rolled and mashed together between the various rollers, from escaping. After the straw has passed between the rollers 16 to 20 and been mashed between them under heavy pressure, it is formed in a thin sheet of straw. This formation of the straw sheet is further facilitated by the corrugated surfaces of the rollers, as shown in Fig. 15, the corrugations extending about the cylindrical surface of each of the rollers and meshing with the corrugations of the adjacent rollers.

After the straw sheet has passed over the roller 20, it engages the endless belt 22 and a lip 23 extending transversely of the machine and outwardly into engagement with said belt, so that the straw sheet cannot pass beyond said lip. This arrangement causes the straw sheet to start rolling upon itself, because of the movement of the belt 22 at a speed substantially the same as that of the roller 20, said belt picking up the straw sheet and carrying it around over the central portion thereof, as best shown in Fig. 2. As more straw is fed into the machine, the larger the roll or the bale of straw becomes, forcing the belt 22 away from the roller 20, as shown in dotted lines in Fig. 2, until the belt has been pushed outwardly to surround the proper size bale, at which time the position of the belt will cause the discharge mechanism to be actuated, cutting off the further feeding of straw and allowing the bale formed to be dropped from the machine, as will be hereinafter more fully described.

The belt 22 is carried between the rollers 24 and 25, over the roller 20 under the rollers 26, 27 and 28, over the roller 29, and thence under the roller 30, and over the roller 31 back to the roller 24. The rollers 24 and 25 are fixedly mounted in the machine. The roller 26 is mounted on a shaft 32 which is carried in the arcuate guide bearings 33 and 33ª, as shown in Fig. 3, so as to be movable up and down therein to compensate for the increase in size of the bale. The rollers 27, 28 and 30 are fixedly mounted upon the machine, but the rollers 29 and 31 are mounted upon an upwardly extending arm 34 which is pivotally mounted on the machine at 35 so as to enable it to move downwardly, as shown in dotted lines in Fig. 2, and thereby permit the belt 22 to be forced outwardly by the bale between the rollers 25 and 26.

For driving the feed rollers and the feeding arms 14 and 15, which are staggered in relation to each other as shown in Fig. 1, there is provided a belt-driven pulley 36 keyed to the sleeve 37 which drives the pinion 38 meshing with the gear 39. The gear 39 is keyed on to the shaft 40, upon which is keyed the gear 41. The shaft 40 extends through the frame in suitable bearings and has mounted thereon the roller 19, whereby said roller is driven through the gears 38 and 39. The gear 41 in turn meshes with the gear 42, see Fig. 3, which is loosely mounted on the shaft 43, but connected with the roller 18 so as to drive the same. The gear 42 meshes with the gear 44 keyed to the shaft 45, upon which is mounted the roller 17. The shaft 45 extends through the sleeve 37 which is loosely mounted thereon and supported thereby. The gear 44 in turn drives the gear 46 which is keyed to the shaft 47 upon which is mounted the roller 16. The gear 46 meshes with the gear 48. The gear 46 is of double width, as shown in Fig. 1, half of it appearing as extending out from the surface of the gear 48, and the other half hidden behind the gear 48 in mesh therewith. The gear 48 is loosely mounted upon the shaft 49 and is locked with said shaft through the clutch mechanism shown in Figs. 12 and 13, which will be hereinafter more fully explained. Keyed on the shaft 49, there is a gear 50 which meshes with and drives the gear 51 keyed on to the shaft 52, whereby when the clutch mechanism shown in Figs. 12 and 13 is in normal position, the shafts 49 and 52 will be driven and the arms 14 and 15 rotated. Through this driving mechanism the rollers 16, 17, 18 and 19 will be driven and also the feeding arms 14 and 15; whereas the rollers 26, 27, 28, 29, 30 and 31 will be only frictionally driven by the belt 22, said belt in turn being driven by the rollers 24 and 25. The belt 22 and rollers 24 and 25 are driven by gears mounted on the opposite side of the machine driven by the shaft 91, as will be hereinafter explained.

As before explained, upon the bale increasing in diameter, the arm 34 will be drawn down, as shown in dotted lines in Fig. 2. Connected with said arm, there is a connecting rod 53 pivoted at one end to the arm 34 and extending through suitable guides at the other end, as shown in Fig. 2, said arm being provided with a projection 54, as shown in Fig. 1. As the arm 34 is drawn down, the rod 53 will be drawn back so that the projection 54 engages on the latch 55, shown in Fig. 4, pulling the latch back against the spring tension of the spring 56, see Fig. 4. As the latch 55 is drawn back, it releases the rod 57 which rests upon a projection thereof, permitting the same to drop down by gravity. The rod 57 pivotally connects the link 58 which is pivoted to the frame; the link 59 which is pivoted to the link 60, which in turn is pivoted to the frame; the link 61 which is pivoted to the arm 62; and the arm 63 which is pivoted near its center to the arm 64. Said rod 57 pivotally maintains all of said links and arms together in their upper and normal position, as shown in Fig. 4, and in turn said rod is held in such position by the latch 55. Therefore, when the latch 55 is pulled from under the rod 57 by the rod 53, said links and arms drop down by gravity. This occurs only when the bale has reached the desired size and pulls the arm 34 down. The gear 65 meshes with the gear 66, as shown in Figs. 4 and 5. Mounted between the gear 65 and the frame of the machine, as shown in Fig. 5, there is a clutch member 67 which is secured upon said gear and moves therewith. Said clutch member is comprised of an outer housing having diametrically opposite openings therein through which slidably extends lateral guides 68 and 69 integral with the split collar members 70. Adjacent the member 70 is an oppositely mounted split collar member 70ª having adjacent projections 71 and 72 extending through said openings. Said members are provided with pins 73 which extend loosely into an annular and rotatably mounted plate 74, so that when one of said members is moved diametrically of the clutch member, the other collar member will move diametrically in the opposite direction, due to their connection with said plate. Connected with said plate, there is a spring 75 for normally maintaining said collar members in such a position that the projection 72 will extend outwardly beyond the surface of the clutch member 67; in which position the lugs 76 extending inwardly from said collar members will engage in the shaft 45, upon which the gear 44 is mounted on the other side of the machine. But when the projection 72 is forced inwardly against the tension of the spring 75, each of said members 70 and 70ª will move in opposite directions to the position shown in Fig. 6, wherein they will disengage said shaft so that said shaft will be free to rotate therein. Similarly mounted upon the shaft 45, there is another clutch member 76 having similarly arranged split collar members 77 and 78, the member 78 having an engaging projection 79 and sliding guide projections 68ª, 69ª and 71ª. Said collars 70 are also provided with the same type of pins 73ª adapted to engage in a similar plate 74ª mounted in the clutch member 76, which plate is yieldingly maintained in position by the spring 75ª. Said collars are arranged with inwardly projecting extensions 76ª which engage in the shafts 45 in the same manner as above described. Positioned upon one of the spokes of the gear 66, as shown in Fig. 5, there is a spring-pressed plunger 80 adapted to normally engage the projection 72 and maintain it in the position shown in Fig. 6, so that the shaft 45 will be disengaged by the collars 70 and 70ª. Said plunger is held in such position by the spring 81 mounted between the supporting bracket 82 and the collar 83, and is of such tension as to overcome the tension of the spring 75, which operates opposite thereto. As shown in Figs. 4 to 7 inclusive, the lever 62 is maintained in its normal or upper position in engagement with the projection 79 which maintains the split collar members 77 and 78 in their disengaging position against the spring tension of the spring 75ª, so that the shaft 45 is free to rotate between said members.

In operation, the parts are in normal position, as above described. They remain stationary while the machine is being operated and the roller 17 and the shaft 45 are rotating. When the arm 34 is drawn down by the increase in diameter of the bale 84, the connecting rod 53 pulls back on the latch 55, permitting the various links and arms supported thereon by the pin 57 to drop down by gravity. This moves the arm 62 down out of engagement with the projection 79, as shown in Fig. 8, so that the collar members 77 and 78 engage in the shaft 45 which is revolving with the machine. This engagement causes the clutch member 76 to rotate with said shaft until it has made one complete revolution; while the member 67 and gear 65 remain stationary. After one complete revolution, the finger 85 engages the clutch member 67 and revolves it sufficiently to cause the pin 72 to slide off of the plunger 80. The collar member 70 and 70ª is then caused to move by the tension of the spring 75 into locking engagement with the shaft 45 so that said clutch member 67 is then moved with said shaft. Since the clutch member 67 is securely fixed upon the face of the gear 65, said gear also moves, and at the same time moves the gear 66. Pivoted to the periphery of the gear 66, there is a connecting rod 86 which is pivoted at its other end to the guide bearing 33 pivoted on the frame at 87. Upon the gear 66 making a half revolution, the guide bearing 33 is moved backward, carrying therewith the roller 26 and belt 22, leaving an appreciable opening immediately beneath the bale 84 through which said bale may drop; and upon said wheel 66 returning to its starting point shown in Fig. 4, said bearing is returned again to normal position for supporting a new bale.

Upon the bale dropping out of the machine, the belt 22 will permit the arm 34 to be raised to starting position by means of the spiral springs 88 mounted on each side of the frame. When the wheel 66 starts its one revolution, the projecting pivot mounting 89 of the rod 86 will engage the arm 63 forcing the levers and the arms 58 to 62 inclusive in their upper or normal position, as shown in Fig. 4, where the latch 55, by means of the spring 56, will re-engage the rod 57 for maintaining them in their upper position. This position then brings the arm 62 into a position to re-engage the projection 79 and cause the clutch member 76 to be disengaged from the shaft 45, as shown in Fig. 7. It will, therefore, be understood that after the bale has been completed and the further feeding of the straw shut off, as will be hereinafter explained, the straw already between the rollers will have time to be wound upon the bale before it is dropped from the machine because of the timing of the above mentioned clutch members. To be more clearly understood, it might be added that at the time the straw is shut off, the lever 62 drops and the clutch member 76 makes one rotation by itself. It then engages the clutch member 67 and they both make a single rotation with the gears 65 and 66, which is a complete revolution of the gear 65 and a one-half revolution of the gear 66. Inasmuch as the links and arms 58 to 62 are elevated when the projection 89 comes in contact with the arm 63, the wheel 66 has only made a very small part of its revolution before the arm 62 is back in normal position so as to cause the release of the members 76 from the shaft 45. Therefore, that member remains stationary after its second revolution while the member 67 continues to make one more revolution until its projection 72 comes into engagement with the plunger 80, when it is released from the shaft 45, causing the gears 65 and 66 to come to a stop after said gear 66 has made its one revolution. During this time the rollers have fed all of the straw then in the machine on to the bale and the bale has been dropped. The mechanism is then in readiness for the starting of a new bale. On the opposite side of the machine, there is a connecting rod 86ª similar to the rod 86 which is pivoted at one end to the guide bearing 33 which is in turn pivoted to the machine at 87ª. The other end of said rod is pivoted to the arm 90 which is keyed on the shaft 43 and has a length equal to the radius of the gear 66, so that the movement of said gear will operate the connecting rods 86 and 86ª.

The rollers 20, 24 and 25 drive the belt 22 at such a speed as to cause it to roll the straw sheet therein. The roller 20 is mounted on the shaft 91 on to which is keyed the gear 92. The roller 24 is mounted on the shaft 93 to which is keyed the gear 94. The roller 25 is mounted on the shaft 95 on which is keyed the gear 96. As shown in Fig. 4, said gears are driven by the gear 97 which is keyed to the shaft 40 and meshes with the gears 92 and 94. In turn the gear 94 meshes with the gear 96.

The feeding of the straw is cut off by means of the arms 98 which extend parallel with each other across the width of the machine between the rotary feeding arms 15, as shown in Figs. 1 and 2. Said arms are secured together and mounted on the under side of the sheet metal covering 99 which extends across the machine and are pivotally mounted at their pivotal ends upon the rod 100. Said rod extends across the machine and is secured at one end to the link 58 and at the other end to the link 101. Said arms are supported between their ends upon a roller 102 mounted between the side members of said frame so as to slide forwardly thereon. The link 101 is pivoted at its upper end to the rod 57 and at its lower end to said frame. Also pivoted to said rod 57, there is the arm 59 which is pivotally linked between its ends to the frame by the link 60, as shown in Fig. 3.

In operation, when the bale has increased to such a diameter as to draw the arm 34 downwardly, the latch 55 is drawn back so as to cause the rod 57 to drop by gravity, as above explained, which causes the link 58 and rod 100 to drop down and move toward the feeding end of the machine. This movement pushes the arms 98 forward on the roller 102 so that they extend between the shafts 49 and 52, preventing any more straw from entering the machine, and thereby cutting off the feed. Simultaneously, the arm 59 is forced downwardly in position to be engaged by the trigger projection 105 mounted on the clutch member 106, shown in Figs. 1, 12 and 13. Upon the engagement of the arm 59 by the projection 105, the latch 107 will be moved about its pivotal mounting at 108 so that its end 109 will be moved out of engagement with the pin 110, as shown in Fig. 13, against the tension of the spring 111. Upon the latch being disengaged from the pin 110, the clutch member 106, which is keyed to the shaft 49, will cease to revolve with the gear 48, which is driven by the gear 46. Inasmuch as the gear 48 is loosely mounted on said shaft, it will continue to rotate while the shaft 49 remains stationary. Also, as the gear 50 is keyed to said shaft and drives the gear 51, both of said gears will remain stationary with the clutch 106 and shaft 49. Therefore, the rotational feeding arms 14 and 15 will be brought to a standstill so that no more straw will be fed into the machine while the bale 84 remains therein and the arm 34 is held down. However, before the arm 34 is again elevated, after the bale has been dropped from the machine, as above explained, the movement of the gear 66 will elevate the rod 57 which will draw the arms 98 back out of the way to the position shown in Fig. 1, and simultaneously withdraw the arm 59, which will permit the latch 107 to re-engage the pin 110, so that the rotary feeding arms 14 and 15 will again be driven through said clutch.

For maintaining the feed rollers in adjacent yielding position so that an appreciable pressure will be exerted upon the straw passing therethrough and still prevent any wedging of the straw between the rollers, the shaft bearings for said rollers are mounted upon the springs 112 shown in Figs. 3 and 4.

From the above description of the various parts of the machine, and the cooperation thereof, it will be understood that the straw will be fed into the machine in such a manner as to mash it into a thin sheet, and cause the thin sheet to be rolled into a bale until the bale reaches a predetermined diameter, at which time the further feeding of the straw is intercepted and cut off. The rotary feeding arms cease to revolve but the feeding rollers continue to feed the straw through a timed number of revolutions, so arranged that upon the straw which is then between the rollers being wound upon the bale, the bale will be discharged from the machine and the supporting belt returned to normal position. But just before the bale is discharged, the feeding mechanism is again started, the cut-off arms removed, and a new sheet of straw is started through the machine, so that it reaches the position of the bale immediately after the bale has been discharged and the belt returned to starting position.

It will be understood that the machine has been shown and described herein as pertaining to the baling of straw. However, it may be similarly used for baling excelsior, cotton, or any other similar type of fibrous material. Attention should also be called to the fact that the arms 98, when in operative position for stopping the further supply of straw from entering the machine, act in conjunction with the arms 14 and 15, which are then stationary to tear the ends of the straw and comb it out, pulling the straw apart so as to leave straggling ends instead of a sharp cut off, the straggling ends being wound upon the bale and entwined in the straw thereon so as to tend to tie in the loose end of the straw sheet. The feeding arms 14 and 15 also travel faster than the rolls 16 and 17 so as to comb out the straw as it is fed into the machine at a slower speed by said rollers.

The chaff riddle projection 113 may be either turned in a horizontal position, as shown in Fig. 2, or down out of the way in vertical position, as shown in dotted lines in Fig. 3. In the former position, it will cause the chaff to be discharged into the passing straw and compressed in the straw sheet, so that the bale will contain a certain amount of chaff which is desirable for certain purposes. However, if the projection 113 is turned down, the chaff will then fall to the bottom of the machine. It should also be explained that the projection 54 on the connecting rod 53 is adjustable thereon in any suitable manner for varying the diameter of the bale as desired, for instance, if said projection is adjusted to a position near the end of the lever, as shown, the bale will become appreciably larger in diameter before it pulls the arms 34 down far enough to cause the projection 54 to trip the latch 55 and actuate the cut-off and discharge mechanism; while if positioned toward the arms 34, said arms will have less movement and the straw bale will be of less diameter when said mechanism is actuated.

As shown in Fig. 16, and as hereinbefore mentioned, the rollers carrying the belt 22 have spirally disposed ribs extending towards the center thereof for frictionally centering the belt and maintaining it in proper position upon said rolls. The centrally extending spiral ribs tend at all times to frictionally push the belt toward the center from both ends and thereby operate against each other to maintain the belt centrally positioned thereon, as will be readily understood.

The invention claimed is:

1. A baling machine for baling straw and the like, comprising a feeding mechanism for receiving straw and feeding it into said machine, a plurality of rollers through which the straw is fed for compressing it into a substantially uniform sheet, an endless belt positioned so as to engage the sheet and cause it to be rolled upon itself to form a substantially cylindrical bale, and a cut-off mechanism for cutting off the further feeding of straw into the machine upon said bale reaching a predetermined diameter.

2. A baling machine for baling straw and the like, comprising a feeding mechanism for receiving the straw and feeding it into said machine, means for engaging the straw and causing it to be rolled upon itself to form a substantially cylindrical bale, a cut-off mechanism automatically operated for cutting off the further feeding of the straw in the machine upon the bale reaching a predetermined diameter, and a clutch mechanism for permitting the further feeding of straw to the bale after the cut-off mechanism is operated.

3. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, and clutch mechanism for permitting the further feeding of the straw contained between the rolls to the bale after the cut off mechanism is operated and before the bale is discharged.

4. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, clutch mechanism for permitting the further feeding of the straw contained between the rolls to the bale after the cut off mechanism is operated and before the bale is discharged, and means for returning the cut off mechanism to inoperative position before the discharge of said bale.

5. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a roller positioned beneath said bale over which said belt passes, a pivotally mounted carriage for supporting said roller, and timing mechanism connected with said carriage for actuating the same and causing said roller and belt to be withdrawn from under said bale, allowing the bale to drop from the machine upon said bale reaching a predetermined diameter.

6. A baling machine for baling straw and the like comprising a feeding mechanism for receiving the straw and feeding it into said machine, means for rolling the straw upon itself to form a substantially cylindrical bale, a plurality of arms arranged to extend into the path of the feeding mechanism for cutting off the straw fed therethrough, means for causing said arms to be so extended into operative position upon the bale reaching a predetermined diameter, and means for returning said arms to inoperative position.

7. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a plurality of arms arranged to be extended into the path of the feeding mechanism for cutting off the straw fed therethrough, means for causing said arms to be so extended in the operative position upon the bale reaching a predetermined diameter, and means for returning said arms to inoperative position.

8. A baling machine for baling straw and the like comprising a feeding mechanism for receiving the straw and feeding it into said machine, means for forming said straw into a substantially cylindrical bale, a yieldingly mounted arm for carrying said means so as to permit said bale to be formed with increasing diameter, a clutch mechanism operated by said arm when said bale reaches a predetermined diameter for stopping the further operation of the feeding mechanism, a cut-off mechanism controlled thereby for cutting off the straw being fed into said machine, and a second clutch mechanism controlled by the movement of said arm so timed as to permit the discharge of said bale from the machine upon the completion thereof.

9. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a yieldingly mounted arm for carrying said belt so as to permit it to increase with the diameter of the bale, a clutch mechanism operated by said arm when said bale reaches a predetermined diameter for stopping the further rotation of the feeding mechanism, cut-off mechanism controlled thereby for cutting off the further feeding of the straw into said machine, and a second clutch mechanism controlled by the movement of said arm so timed as to permit the discharge of said bale from said machine upon the straw contained therein being rolled upon said bale.

10. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a yieldingly mounted arm for carrying said belt so as to permit it to increase with the diameter of the bale, a clutch mechanism operated by said arm when said bale reaches a predetermined diameter for stopping the further rotation of the feeding mechanism, cut-off mechanism controlled thereby for cutting off the further feeding of the straw into said machine, a second clutch mechanism controlled by the movement of said arm so timed as to permit the discharge of said bale from said machine upon the straw contained therein being rolled upon said bale, and mechanism associated with said second mentioned clutch for actuating said first mentioned clutch and cut-off mechanism bringing them to inoperative position so as to permit the feeding of the new batch of straw into said machine before the completion of the bale and the discharge thereof from the machine.

11. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, clutch mechanism for permitting the further feeding of the straw contained between the rolls to the bale after the cut-off mechanism is operated and before the bale is discharged, and a roller mounted in said machine over which said belt is adapted to pass having spirally disposed ribs passing about its periphery and extending from each end thereof toward the center for frictionally maintaining said belt upon the roll and centering the same.

12. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting said belt to pass about said bale as it is increased in diameter by being rolled, and a plurality of arms adapted to extend into the feeding mechanism when in operative position for combing the straw and pulling it apart while being drawn into said machine upon the feeding mechanism being stopped, whereby the end of the sheet of straw will be left with straggling ends.

13. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a cut-off mechanism for cutting off the further feeding of straw into the machine upon said bale reaching a predetermined diameter, means for permitting said rollers to continue feeding the straw into the bale to maintain the passing of the straw contained in the machine to the bale after the feeding of new straw therein has been cut off and before the bale is discharged, said feeding mechanism comprising a plurality of rotary arms, and means for rotating said arms at a faster speed than said rollers and for combing the straw as it passes from the feeding mechanism to said rollers.

14. A baling machine for baling straw and the like comprising a feeding mechanism for receiving straw and feeding it into said machine, means for engaging and rolling the straw upon itself to form a substantially cylindrical bale, a chaff riddle positioned adjacent the feeding mechanism, and a projecting member pivotally mounted on said riddle for discharging the chaff into said machine to be baled with the straw, and when turned in another position to permit said chaff to be discharged from the machine so as not to be baled therewith.

15. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting said belt to pass about said bale as it is increased in diameter by being rolled, a chaff riddle positioned adjacent the feeding mechanism, and a projecting member pivotally mounted on said riddle for discharging the chaff into said machine to be baled with the straw, and when turned in another position to permit said chaff to be discharged from the machine so as not to be baled therewith.

16. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a cut-off mechanism for cutting off the further feeding of straw into the machine upon said bale reaching a predetermined diameter, and means for permitting said rollers to continue feeding the straw into the bale to maintain the passing of the straw contained in the machine to the bale after the feeding of new straw therein has been cut off and before the bale is discharged, said rollers having annular corrugations about their peripheries for corrugating the straw sheet as it passes therethrough for forming it in a more homogeneous mass.

17. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, clutch mechanism for permitting the further feeding of the straw contained between the rolls to the bale after the cut-off mechanism is operated and before the bale is discharged, means for returning the cut-off mechanism to inoperative position before the discharge of said bale, and a scraping member positioned adjacent said belt for preventing the straw from escaping and causing it to roll upon itself for forming the bale.

18. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, clutch mechanism for permitting the further feeding of the straw contained between the rolls to the bale after the cut off mechanism is operated and before the bale is discharged, means for returning the cut-off mechanism to inoperative position before the discharge of said bale, a scraping member positioned adjacent the belt and below the top of the last roller over which the straw passes, and a guide member positioned adjacent said belt and above the surface of said roller for preventing the escape of the straw when it strikes the belt and causing the straw to become bunched for forming the core of the bale.

19. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, clutch mechanism for permitting the further feeding of the straw contained between the rolls to the bale after the cut-off mechanism is operated and before the bale is discharged, means for returning the cut-off mechanism to inoperative position before the discharge of said bale, a roller over which said belt passes, a bearing member mounted on each side of said machine having an arcuate slot therein in which said roller is loosely mounted for guiding its movement and permitting it to move as said belt is carried about the bale while increasing in diameter.

20. A baling machine for baling straw and the like, comprising a feeding mechanism for receiving the straw and feeding it into said machine, a plurality of rollers through which the straw is fed for compressing it into a substantially uniform sheet, and endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, clutch mechanism for permitting the further feeding of the straw contained between the rolls to the bale after the cut-off mechanism is operated and before the bale is discharged, a plurality of rollers mounted in said machine over which said belt is adapted to pass having spirally disposed ribs passing about its periphery and extending from each end thereof toward the center for frictionally maintaining said belt upon the roll and centering the same, and spiral springs mounted on said machine for normally maintaining said arm in its upper position for holding said belt taut about the bale and permitting said arm to be lowered by the increase in diameter of said bale against the tension of said spring.

21. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, means for permitting the discharge of the bale from the machine upon said bale being enlarged to the predetermined diameter, a cut-off mechanism automatically operated for cutting off the further feeding of the straw in the machine upon the bale reaching a predetermined diameter, clutch mechanism for permitting the further feeding of the straw contained between the rolls to the bale after the cut-off mechanism is operated and before the bale is discharged, a plurality of rollers mounted in said machine over which said belt is adapted to pass having spirally disposed ribs passing about its periphery and extending from each end thereof toward the center for frictionally maintaining said belt upon the roll and centering the same, a spring for normally maintaining said arm in upright position, a plurality of rollers mounted on said arm over which said belt passes, and a roller positioned on said machine in a plane between said last mentioned rollers for providing a block and tackle arrangement, whereby the pressure exerted on the bale by said belt through the tension of said spring will be increased thereover.

22. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a cut-off mechanism for cutting off the further feeding of straw into the machine upon said bale reaching a predetermined diameter, and means for permitting said rollers to continue feeding the straw into the bale to maintain the passing of the straw contained in the machine to the bale after the feeding of new straw therein has been cut off and before the bale is discharged, said rollers having annular corrugations about their peripheries for corrugating the straw sheet as it passes therethrough for forming it in a more homogeneous mass, said second clutch mechanism comprising a pair of split collars provided with oppositely disposed engaging projections adapted to be moved into and out of operative position when one of said collars is engaged.

23. A baling machine for baling straw and the like, comprising a feeding mechanism for receiving the straw and feeding it into said machine, a plurality of rollers through which the straw is fed for compressing it into a substantially uniform sheet, an endless belt positioned so as to engage the sheet and cause it to be rolled upon itself to form a substantially cylindrical bale, a cut-off mechanism for cutting off the further feeding of straw into the machine upon said bale reaching a predetermined diameter, means for permitting said rollers to continue feeding the straw into the bale to maintain the passing of the straw contained in the machine to the bale after the feeding of new straw therein has been cut off and before the bale is discharged, said rollers having annular corrugations about their peripheries for corrugating the straw sheet as it passes therethrough for forming it in a more homogeneous mass, and a connecting rod secured to said arm for causing the actuation of said clutch mechanism when said arm is moved to a predetermined position.

24. A baling machine for baling straw and the like, comprising a feeding mechanism for receiving the straw and feeding it into said machine, a plurality of rollers through which the straw is fed for compressing it into a substantially uniform sheet, an endless belt positioned through which the straw is fed for compressing it into a substantially uniform sheet, an endless belt positioned so as to engage the sheet and cause it to be rolled upon itself to form a substantially cylindrical bale, a cut-off mechanism for cutting off the further feeding of straw into the machine upon said bale reaching a predetermined diameter, means for permitting said rollers to continue feeding the straw into the bale to maintain the passing of the straw contained in the machine to the bale after the feeding of new straw therein has been cut off and before the bale is discharged, said rollers having annular corrugations about their peripheries for corrugating the straw sheet as it passes therethrough for forming it in a more homogeneous mass, a connecting rod secured to said arm for causing the actuation of said clutch mechanism when said arm is moved to a predetermined position, and an adjustable projection on said arm for engaging and actuating said clutch mechanism when said arm is moved to a predetermined position, the adjustment of said projection determining the diameter of the bale.

In witness whereof, I have hereunto affixed my signature.

BRAZELTON T. BROWN.